United States Patent [19]

Iida et al.

[11] Patent Number: 4,966,873

[45] Date of Patent: Oct. 30, 1990

[54] CATALYSTS FOR THE REMOVAL OF NITROGEN OXIDES

[75] Inventors: Kozo Iida; Toru Seto; Yoshiaki Obayashi, all of Hiroshima, Japan

[73] Assignee: Mitsubishi Jukogyo Kabushiki Kaisha, Tokyo, Japan

[21] Appl. No.: 277,718

[22] Filed: Nov. 30, 1988

[30] Foreign Application Priority Data

Dec. 2, 1987 [JP] Japan .................................. 62-304770

[51] Int. Cl.$^5$ ............................................. B01J 21/16
[52] U.S. Cl. ...................................... 502/84; 502/226; 502/218; 502/350
[58] Field of Search ................. 502/218, 350, 226, 60, 502/84

[56] References Cited

FOREIGN PATENT DOCUMENTS 1943759  4/1971  Fed. Rep. of Germany ...... 502/218
0012791  2/1978  Japan .................................. 502/218
3091142  4/1988  Japan .................................. 502/218

Primary Examiner—Chung K. Pak
Attorney, Agent, or Firm—McAulay Fisher Nissen & Goldberg

[57] ABSTRACT

Disclosed is a catalyst for removing nitrogen oxides from exhaust gases from internal combustion devices such as boilers, gas turbine and diesel engines which is characterized in that the catalyst contains Component A comprising type II anhydrous gypsum (insoluble anhydrite) and Component B comprising titanium oxide, the sum of the weights of Components A and B is equal to or more than 80 weight % of the total weight of the catalyst, the weight ratio of Component B to (Component A + Component B) is between 0.05 and 0.3, and the catalyst contains at least one or more of the oxides of vanadium, tungsten, molybdenum, iron, copper, chromium and manganese.

2 Claims, 1 Drawing Sheet

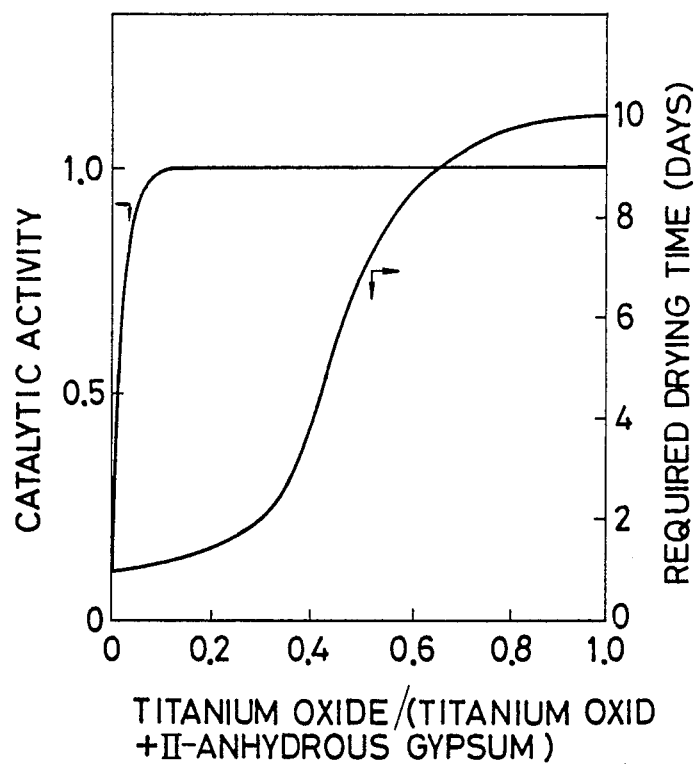

CATALYSTS FOR THE REMOVAL OF NITROGEN OXIDES

FIELD OF THE INVENTION AND RELATED ART STATEMENT

The present invention relates to catalysts for the removal of nitrogen oxides in exhaust gases from internal combustion engines and other combustion devices such as boilers, gas turbines and diesel engines.

As a method for removing nitrogen oxides, widely used is the method of decomposing nitrogen oxides into nitrogen and water on contact with a reducing catalyst after adding ammonia to exhaust gases. As a catalyst for removing nitrogen oxides in exhaust gases, a catalyst has been known that contains titanium oxide as a main component and vanadium, tungsten, molybdenum and the like as active components. This catalyst is also known to be superior in its removal capability of nitrogen oxides.

This catalyst is often formed by extrusion and used in an arrangement such as grid-like honeycomb or a parallel array of plates in order to prevent the catalyst from clogging up or to reduce pressure losses in the exhaust gas being treated.

This catalyst having titanium oxide as a main component has to be dried very slowly and carefully after extrusion in order to obtain a good shape and high strength as honeycomb, making its manufacture difficult.

Also, although the catalyst contains relatively expensive materials such as titanium oxide and other active components mentioned above, it is only a surface layer of 100μm from the very surface of the catalyst body that is actually active in denitration; the rest of these expensive materials has simply been wasted.

In view of these problems, catalysts that use gypsum as a carrier have recently been proposed (for example, see Japanese Pat. Publication No.7306/1978 (53-7306) and Japanese Pat. Publication No.12909/1985 (60-12909)). These proposed catalysts are prepared by first mixing gypsum dihydrate, hemihydrate gypsum and titanium oxide and/or vanadyl sulfate with water, then kneading and extruding the mixture, and finally heating and forming it at 120-350° C.

It is, however, difficult to form the catalysts with gypsum dihydrate into a desired shape because they shrink as crystal water goes out when they are heated at the final stage of preparation. Also, because their strength remains low, they are difficult to use.

Further, the catalysts with hemihydrate gypsum have, on top of the same problem as the ones with gypsum dihydrate have, the problem that they is difficult to handle during manufacture because hemihydrate gypsum tends to turn into gypsum dihydrate, making them difficult to use in practice.

OBJECT AND SUMMARY OF THE INVENTION

It is an object of the present invention to provide an inexpensive and practical catalyst that achieves the substantially same denitration effects as the conventional catalysts having titanium oxide as a main component. To this end, the present invention provides a catalyst for the removal of nitrogen oxides which is characterized in that the catalyst contains Component A comprising type II anhydrous gypsum insoluble anhydrite, insoluble anhydrous $CaSO_4$) and Component B comprising titanium oxide, the sum of the weights of Components A and B is equal to or more than 80 weight % of the total weight of the catalyst, the weight ratio of Component B to (Component A+Component B) is between 0.05 and 0.3, and the catalyst contains at least one of the oxides of vanadium, tungsten, molybdenum, iron, copper, chromium and manganese.

BRIEF DESCRIPTION OF THE DRAWING

The figure is a graph showing the catalytic activity and required drying time of a catalyst& of the present invention as functions of the weight ratio of titanium oxide to titanium oxide and type II anhydrous gypsum (i.e., as functions of (titanium oxide)/(titanium oxide+type II anhydrous gypsum)).

DETAILED DESCRIPTION OF PREFERRED EMBODIMENTS

As crystal forms of gypsum, gypsum dihydrate, αhemihydrate gypsum, β-hemihydrate gypsum, type II anhydrous gypsum (insoluble anhydrite, type II anhydrous $CaSO_4$), type III anhydrous gypsum (soluble anhydrite, γ-$CaSO_4$), etc. are known. Gypsum dihydrate does not have enough strength when made into a catalyst. Since hemihydrate gypsum does not have enough strength and is easy to harden while being formed into a desired shape, it is difficult to handle. Type III anhydrous gypsum (soluble anhydrite) has such a problem as being also easy to harden and difficult to handle. On the other hand, because it is stable with little chemical and physical change, type II anhydrous gypsum (insoluble anhydrite) is most suitable as an ingredient for a catalyst. The catalyst of the present invention contains type II anhydrous gypsum (insoluble anhydrite), which is most suitable for a catalyst, and titanium oxide, which is necessary to activate the catalyst, as major components, their weight is equal to or more than 80 weight %, and the ratio of type II anhydrous gypsum to titanium oxide is given as the weight ratio of (titanium oxide)/(titanium oxide+type II anhydrous gypsum) which is between 0.05 and 0.3. The ratio between titanium oxide and type II anhydrous gypsum (insoluble anhydrite) has been defined as above for the following reasons. (1)If the ratio of (titanium oxide)/(titanium oxide+insoluble anhydrite) is between 1.0 and 0.1, then as shown in the attached figure the catalytic activity can be maintained to a constant as the amount of the active component increases if this ratio becomes equal to 0.05 or less, however, the activity decreases rapidly. (2)Also, the required drying time for preventing the catalyst from cracking after the catalyst is extruded into a honeycomb-shape increases rather suddenly as this weight ratio becomes more than 0.3, making it technically difficult to manufacture a catalyst without cracks. The reason is not clear for shorter required drying times of the catalyst with the ratio less than 0.3, compared to a catalyst whose main component is titanium but which contains no insoluble anhydride. A possible reason is that the relative surface area of the former is as small as about one fifth (measured by the BET adsorption method).

From these results, it can be understood why the ratio of titanium oxide to type II anhydrous gypsum (insoluble anhydrite) should be a value between 0.05 and 0.3 of the (titanium oxide)/(titanium oxide+type II anhydrous gypsum) weight ratio.

Also, the diameter of crystalline particles of type II anhydrous gypsum (insoluble anhydrite) is 0.1-5 μm, and catalyst macropores are formed because of such particle diameters. These macropores thus formed promote diffusion of exhaust gases into the body of a catalyst and the whole catalyst can be utilized to the effect of increased catalytic activity.

Furthermore, catalytic activity is further enhanced by inclusion of at least one of the oxides of vanadium, tungsten, molybdenum, iron, copper, chromium and manganese.

In addition, it is also possible to add binder components, such as, inorganic fibers including glass fiber, or clay or the like.

EMBODIMENTS

Embodiment 1

After mixing powders of 58 weight parts of type II anhydrous gypsum (insoluble anhydrite), 7.5 weight parts of titanium oxide, 0.6weight parts of para-ammonium tungstate, 0.4 weight parts of meta-ammonium vanadate, 7.5 weight parts of kaolin, and 1 weight part of glass fiber very well, 20 weight parts of water and 5 weight parts of an organic binder component were added and the mixture was kneaded in a kneader. Then, it was extruded into a cylindrical shape which is 3mm in diameter and 5mm in length. After wind dried for about one day, the catalyst was baked in an electric furnace at 550° C. for 3 hours.

Embodiment 2

After mixing powders of 58 weight parts of type II anhydrous gypsum (insoluble anhydrite), 7.5 weight parts of titanium oxide, 0.6 weight parts of ammonium molybdate, 0.4 weight parts of meta-ammonium vanadate, 7.5 weight parts of kaolin, and 1 weight part of glass fiber very well, 20 weight parts of water and 5 weight parts of an organic binder component were added and the mixture was kneaded in a kneader. Then, it was extruded into a cylindrical shape which is 3mm in diameter and 5mm in length. After wind dried for about one day, the catalyst was baked in an electric furnace at 550° C. for 3 hours.

Embodiment 3

After mixing powders of 58 weight parts of type II anhydrous gypsum (insoluble anhydrite), 7.5 weight parts of titanium oxide, 0.4 weight parts of meta ammonium vanadate, 7.5 weight parts of kaolin, and 1 weight part of glass fiber very well, 20 weight parts of water and 5 weight parts of an organic binder component were added and the mixture was kneaded in a kneader. Then, it was extruded into a cylindrical shape which is 3mm in diameter and 5mm in length. After wind dried for about one day, the catalyst was baked in an electric furnace at 550° C. for 3 hours.

Embodiment 4

After mixing powders of 58 weight parts of type II anhydrous gypsum (insoluble anhydrite), 7.5 weight parts of titanium oxide, 5 weight parts of ferric sulfate, 7.5 weight parts of kaolin, and 1 weight part of glass fiber very well, 20 weight parts of water and 5 weight parts of an organic binder component were added and the mixture was kneaded in a kneader. Then, it was extruded into a cylindrical shape which is 3mm in diameter and 5mm in length. After wind dried for about one day, the catalyst was baked in an electric furnace at 550° C. for 3 hours.

Embodiment 5

After mixing powders of 58 weight parts of type II anhydrous gypsum (insoluble anhydrite), 7.5 weight parts of titanium oxide, 5 weight parts of copper sulfate, 7.5 weight parts of kaolin, and 1 weight part of glass fiber very well, 20 weight parts of water and 5 weight parts of an organic binder component were added and the mixture was kneaded in a kneader. Then, it was extruded into a cylindrical shape which is 3mm in diameter and 5mm in length. After wind dried for about one day, the catalyst was baked in an electric furnace at 550° C. for 3 hours.

Embodiment 6

A powder of titanium oxide containing 5 weight % of $V_2O_5$ and 8 weight % of $WO_3$ was obtained after impregnating a 10% methyl amine solution of meta-ammonium vanadate and para-ammonium tungstate into an ingredient powder of titanium oxide and drying and baking at 450° C. for 3 hours. After mixing powders of 9 weight parts of the titanium oxide powder thus obtained, 58 weight parts of type II anhydrous gypsum (insoluble anhydrite), 7.5 weight parts of kaolin, and 1 weight part of glass fiber very well, 20 weight parts of water and 5 weight parts of an organic binder component were added and the mixture was kneaded in a kneader. Then, it was extruded into a cylindrical shape which is 3mm in diameter and 5mm in length. After wind dried for about one day, the catalyst was baked in an electric furnace at 550° C. for 3 hours.

Comparative Example 1

After mixing powders of 65.5 weight parts of titanium oxide, 0.4 weight Parts of meta-ammonium vanadate, 5.2 weight parts of para-ammonium tungstate, 7.5 weight parts of kaolin, and 1 weight part of glass fiber very well, 20 weight parts of water and 5 weight parts of an organic binder component were added and the mixture was kneaded in a kneader. Then, it was extruded into a cylindrical shape which is 3mm in diameter and 5mm in length. After dried for about 10 days with close attention to its drying speed, the catalyst was baked in an electric furnace at 550° C. for 3 hours.

In FIG. 1 we show the results for the percentage of removed nitrogen oxide obtained under the following condition for the catalysts of Embodiments 1–6 and Comparative Example 1

| Condition: | |
| --- | --- |
| Amount of catalyst: 20 ml | $SO_2$: 400 ppm |
| SV: 20000 h$\gamma^{-1}$ | $O_2$: 5% |
| Temperature: 350° C. | $H_2O$: 10% |
| NO: 150 ppm | The rest: $N_2$ |
| $NH_3$: 150 ppm | |

TABLE 1

The Percentage of Removed Nitrogen Oxide

| Catalyst | Denitration (%) |
| --- | --- |
| Embodiment 1 | 86.2 |
| Embodiment 2 | 85.1 |
| Embodiment 3 | 85.6 |
| Embodiment 4 | 82.3 |
| Embodiment 5 | 82.5 |
| Embodiment 6 | 87.0 |

TABLE 1-continued

| The Percentage of Removed Nitrogen Oxide | |
|---|---|
| Catalyst | Denitration (%) |
| Comparative Example 1 | 86.5 | where, denitration (%) =
(NO(ppm) at inlet − NO(ppm) at outlet)/(NO(ppm) at inlet).

Embodiment 7

After mixing powders of 58 weight parts of type II anhydrous gypsum (insoluble anhydrite), 7.5 weight parts of titanium oxide, 0.4 weight parts of meta-ammonium vanadate, 7.5 weight parts of kaolin, and 1 weight part of glass fiber very well, 20 weight parts of water and 5 weight parts of an organic binder component were added nd the mixture was kneaded in a kneader. Then, it was extruded into a grid-like honeycomb of 10 openings by 10 openings whose openings are 6mm in size and whose wall thickness is 1.4mm to obtain a catalyst body of 50cm in length.

Embodiment 8

After mixing powders of 47.5 weight parts of type II anhydrous gypsum (insoluble anhydrite), 18 weight parts of titanium oxide, 0.4 weight parts of meta-ammonium vanadate, 7.5 weight parts of kaolin, and 1 weight part of glass fiber very well, 20 weight parts of water and 5 weight parts of an organic binder component were added and the mixture was kneaded in a kneader. Then, it was extruded into a grid-like honeycomb of 10 openings by 10 openings whose openings are 6mm in size and whose wall thickness is 1.4mm to obtain a catalyst body of 50cm in length.

Comparative Example 2

After mixing powders of 35.5 weight parts of type II anhydrous gypsum (insoluble anhydrite), 30 weight parts of titanium oxide, 0.4 weight parts of meta-ammonium vanadate, 7.5 weight parts of kaolin, and 1 weight part of glass fiber very well, 20 weight parts of water and 5 weight parts of an organic binder component were added and the mixture was kneaded in a kneader. Then, it was extruded into a grid-like honeycomb of 10 openings by 10 openings whose openings are 6mm in size and whose wall thickness is 1.4mm to obtain a catalyst body of 50cm in length.

Comparative Example 3

After mixing powders of 65.5 weight parts of titanium oxide, 0.4 weight parts of meta-ammonium vanadate, 7.5 weight parts of kaolin, and 1 eight part of glass fiber very well, 20 eight parts of water and 5 weight parts of an organic binder component were added and the mixture was kneaded in a kneader. Then, it was extruded into a grid-like honeycomb of 10 openings by 10 openings whose openings are 6mm in size and whose wall thickness is 1.4mm to obtain a catalyst body of 50cm in length.

The catalyst bodies thus formed of Embodiments 7 and 8 and Comparative Examples 2 and 3 were left and let dry in an atmosphere of 25° C. in temperature and 60% in relative humidity and were observed for cracks. Then, the results shown in Table 2 were obtained.

TABLE 2

| | Results of Observation for Cracks | | |
|---|---|---|---|
| Catalyst Body | After 1 Day | After 2 Days | After 5 Days |
| Embodiment 7 | No cracks | No cracks | No cracks |
| Embodiment 8 | No cracks | No cracks | No cracks |
| Comp. Example 2 | No cracks | Cracks | Many cracks |
| Comp. Example 3 | No cracks | Cracks | Many cracks |

The catalysts of the present invention are easier to be formed into desired shapes and shorten times necessary for drying and considerably save expensive titanium oxide and other active components to a great economical advantage while they show about the same catalytic denitration performance as conventional catalysts having titanium oxide as a main component.

What is claimed is:

1. A catalyst for the removal of nitrogen oxides which is characterized in that the catalyst contains Component A comprising type II anhydrous gypsum and Component B comprising titanium oxide, the sum of the weights of Components A and B is equal to or more than 80 weight % of the total weight of the catalyst, the weight ratio of Component B to (Component A + Component B) is between 0.05 and 0.3, and the catalyst contains clay, an inorganic fiber and at least one or more of the oxides of vanadium tungsten, molybdenum, iron, copper, chromium and manganese.

2. The catalyst for the removal of nitrogen oxides as in claim 1, whereby the particle diameter of type II anhydrous gypsum is between 0.1 and 5 μm.

* * * * *